(12) United States Patent
Alshawi

(10) Patent No.: US 6,233,544 B1
(45) Date of Patent: May 15, 2001

(54) METHOD AND APPARATUS FOR LANGUAGE TRANSLATION

(75) Inventor: Hiyan Alshawi, Summit, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 08/665,182

(22) Filed: Jun. 14, 1996

(51) Int. Cl.$^7$ ..................................... G06F 17/28
(52) U.S. Cl. ............................................... 704/2
(58) Field of Search ........................ 704/1, 2–4, 9–10, 704/256, 257; 707/532

(56) References Cited

U.S. PATENT DOCUMENTS

| | | | |
|---|---|---|---|
| 4,868,750 | 9/1989 | Kucera et al. | 704/9 |
| 5,136,503 | * 8/1992 | Takagi et al. | 704/2 |
| 5,477,451 | * 12/1995 | Brown et al. | 704/2 |
| 5,608,624 | * 3/1997 | Luciw | 707/532 |
| 5,621,859 | * 4/1997 | Schwartz | 704/256 |
| 5,625,814 | * 4/1997 | Luciw | 707/5 |
| 5,737,621 | * 4/1998 | Kaplan et al. | 704/6 |

FOREIGN PATENT DOCUMENTS

| | | | |
|---|---|---|---|
| 0 525 470 | 2/1993 | (EP) | G06F/17/28 |
| 0 568 319 | 11/1993 | (EP) | G06F/17/28 |
| 0 651 340 | 5/1995 | (EP) | G06F/17/28 |

OTHER PUBLICATIONS

Brown, et al., "A Statistical Approach to machine Translation" Computational Linguistics, vol. 16, No. 2, Jun. 1990, pp. 79–85.*

"Method for Inferring Lexical Associations from Textual Co–Occurrences", IBM Technical Disclosure Bulletin, vol. 33, No. 1B, 1 Jun., pp. 54/55.

* cited by examiner

Primary Examiner—Forester W. Isen
Assistant Examiner—Patrick N. Edouard (57) ABSTRACT

Methods and systems for language translation are disclosed. The translator is based on finite state machines that can convert a pair of input symbol sequences to a pair of output symbol sequences. The translator includes a lexicon associating a finite state machine with a pair of head words with corresponding meanings in the source and target languages. The state machine for a source language head word w and a target language head word v reads the dependent words of w to its left and right in a source sentence and proposes corresponding dependents to the left and right of v in a target language sentence being constructed, taking account of the required word order for the target language. The state machines are used by a transduction search engine to generate a plurality of candidate translations via a recursive process wherein, a source language head word is first translated as described above, and then the heads of each of the dependent phrases are similarly translated, and then their dependents and so on. Only the state machines corresponding to the words in the source language string are activated and used by the search engine. The translator also includes a parameter table that provides costs for actions taken by each finite state machine in converting between the source language and the target language. The costs for machine transitions are indicative of the likelihood of co-occurence of pairs of words in the source language, and between corresponding pairs of words in the target language. The transduction search engine provides a total cost, using the parameter table, for each of the candidate translations. The total cost of a translation is the sum of the cost for all actions taken by each machine involved in the translation.

14 Claims, 5 Drawing Sheets

METHOD AND APPARATUS FOR LANGUAGE TRANSLATION

FIELD OF THE INVENTION

The present invention relates to automatic language translation. More particularly, the present invention relates to methods and apparatus for direct translation utilizing a probabilistic lexical transduction model.

BACKGROUND OF THE INVENTION

Language translation involves the conversion of sentences from one natural language, usually referred to as the "source" language, into another language, typically called the "target" language. When performed by a machine, e.g., a computer, such translation is referred to as automatic language translation or machine translation.

Many different methods for automatic language translation have been proposed and implemented over the last few decades. See Hutchins, W. J. and Somer, H. L., *An Introduction to Machine Translation*, (Academic Press, N.Y. 1992). Most translation systems utilize mapping via intermediate representation. For example, in the so called "interlingua" translation systems, the intermediate representation is a language-independent representation resulting from an initial analysis of the source language sentence. The intermediate representation is then converted into the target language by a generation phase. See, for example, Nirenburg et al., *Machine Translation: A Knowledge-Based Approach*, (Morgan Kaufmann, San Mateo, Calif. 1992). A second example of mapping via intermediate representation are the "transfer" translation systems. Such systems include three phases; analysis of the source language sentence into a source representation, conversion of the source representation into a target representation, and generation of a target sentence from the target representation. See, van Noord et al., "An Overview of Mimo2," v.6 Machine Translation, pp. 201–04, 1991.

A second type of translation system can be classified as a "direct" translation system. Such direct methods do not use intermediate representations. Some of the earliest translation systems utilized direct methods; however, they were ad-hoc in nature, depending on large collections of translation rules and exceptions.

Recently, more systematic direct translation methods have been proposed. One such method is based on a statistical model for mapping words of the source sentence into words and word positions in the target language. A drawback of that method is that it ignores the arrangement of phrases in the source and target sentences when mapping a word into its corresponding position in the target language sentence. The method therefore ignores lexical relationships that make one position in the target sentence more likely than another. Brown et al., "A Statistical Approach to Machine Translation," v. 16 Computational Linguistics, pp. 79–85, 1990. In another direct method, a syntax tree is built up simultaneously for the source and target sentences, using special phrase structure rules that can invert the order of syntactic constituents. A drawback of this method is that it does not take into account word to word associations in the source and target languages. See, Wu, D., "Trainable Coarse Bilingual Grammars for Parallel Text Bracketing," 1995 Proc. Workshop Very Large Corpora, Cambridge Mass.

A third direct translation system has been proposed that uses standard left-to-right finite state transducers for translation. Using such standard finite state transducers limits the ability of the method to allow for words in the target sentence being arbitrarily far away from their original position in the source sentence. This is because, for non-trivial vocabularies, the required number of transducer states becomes too large for practical use. See Vilar et al., "Spoken-Language Machine Translation in Limited Domains: Can it be Achieved by Finite-State Models?," 1995 Proc. Sixth Int'l. Conf. Theoretical and Methodological Issues in Machine Translation, Leuven, Belgium.

Thus, there is a need for an improved system and method for automatic language translation.

SUMMARY OF THE INVENTION

An improved direct system and method for language translation is disclosed. According to the present invention, the translator consists of a plurality of finite state transducers referred to as head transducers, a bilingual lexicon associating pairings of words from the two languages with particular head transducers, a parameter table specifying "cost" values for the actions taken by the transducers and a transduction search engine for finding the lowest cost translation of an input phrase or sentence. The action costs code lexical associations in the source and target language; a lower cost corresponding to a stronger lexical association.

The head transducers utilized in the present invention are distinct from the standard finite state transducers known in the art. Standard transducers are typically limited to converting a single input sequence into a single output sequence, usually reading the input sequence from left to right. The present head transducers have the ability to read a pair of sequences, one scanned leftwards, the other scanned rightwards, and write a pair of sequences, one leftwards, the other rightwards.

Each head transducer is associated with a pair of "head" words with corresponding meanings in the source and target languages. A head word is typically the word carrying the basic or most important meaning of a phrase. Head words are associated with dependents, which are the head words of subphrases of the phrase. The purpose of a transducer for a particular head word pairing is to (i) recognize dependent words to the left and right of the source language head word and (ii) propose corresponding dependents to the left and right of the target language head word in the target sentence being constructed.

A bilingual lexicon with associated head transducers will allow for many possible translations of a sentence. This results from the many different possible choices for entries from the lexicon, including choices of target words, choices of the heads of phrases in the source sentence and choices of the dependent words in the source and target phrases. The parameter table provides different "costs" for such choices reflecting association strengths, i.e., indicative of the likelihood of co-occurence, for source-target word translations and for head-dependent word pairs in each of the two languages. Thus, a total translation cost may be defined as the sum of the costs of all the choices leading to that translation. The translation with the lowest total cost is selected as the output of the translator, that is, the translation.

The search for the lowest cost translation is carried out by the transduction search engine. The transduction search engine utilizes the head transducers to recursively translate first the head word, then the heads of each of the dependent phrases, and then their dependents, and so on. This process is referred to herein as recursive head transduction.

The present system and methods do not requiring modeling of word positions directly, avoiding the drawback of the method proposed by Brown. Furthermore, the present system and methods are purely lexical. As such, unlike the method proposed by Wu, the present invention does not require syntactic rules. Rather, the best translation is chosen on the basis of word-to-word association strengths in the source language and the target language. Moreover, the head transducers utilized in the present invention allows the words in the target sentence to be arbitrarily far away from their corresponding positions in the source sentence without a corresponding increase in the number of model states.

BRIEF DESCRIPTION OF THE DRAWINGS

Further aspects of the invention will become more apparent from the following detailed description of specific embodiments thereof when read in conjunction with the accompanying drawings in which.

DETAILED DESCRIPTION

The present invention relates to improved systems and methods for automatic language translation. It should be understood that the present invention is applicable to both written and spoken language. As such, the present invention can be utilized as the translation component of a printed text translation system, a handwriting translation system or a speech translation system. Moreover, the present invention relates to natural language translation, as well as the translation of other types of languages, such as programming languages and the like.

For clarity of explanation, the illustrative embodiments of the present invention are presented as individual functional blocks. The functions these blocks represent may be provided using either shared or dedicated hardware, including, without limitation, hardware capable of executing software. Illustrative embodiments may comprise digital signal processor (DSP) hardware, read-only memory (ROM) for storing software performing the operations discussed below, random-access memory (RAM) for storing DSP results and for storing data utilized by the translator for a particular translation and non-volatile memory for storing the complete data set, i.e., full lexicon, cost parameters, and the like used by the translator.

In the balance of this Specification, the description of the invention will be presented as is commensurate with descriptions in the art. For example, operations will be performed on a "source language sentence" or a "source language string" or a "source language phrase," for generating a "target language sentence" or a "target language string" or a "target language phrase." It should be understood that such source and target language sentences, strings or phrases can be embodied as signals. Such signals are processed by the hardware described above. Thus, as used herein, the phrases "source language sentence," "source language string," and the like are interchangeable with the phrase "input signal." Likewise, the phrases "target language sentence," "target language phrase," and the like are interchangeable with the phrase "output signal."

By way of definition, the term "head word" is used herein to refer, typically, to the word carrying the basic or most important meaning of a phrase for translation. For example, the main verb of a sentence may be selected as the head word. It should be understood, however, that the present methods do not require any particular linguistic interpretation of the term. The dependents of a head word are the head words of subphrases of the phrase. For example, the dependents of a verb heading a sentence might include the main noun of the subject noun phrase of the sentence and also the main noun of the object noun phrase of the sentence. As used herein, the terms word, symbol and character are interchangeable except as noted.

Figure 1:
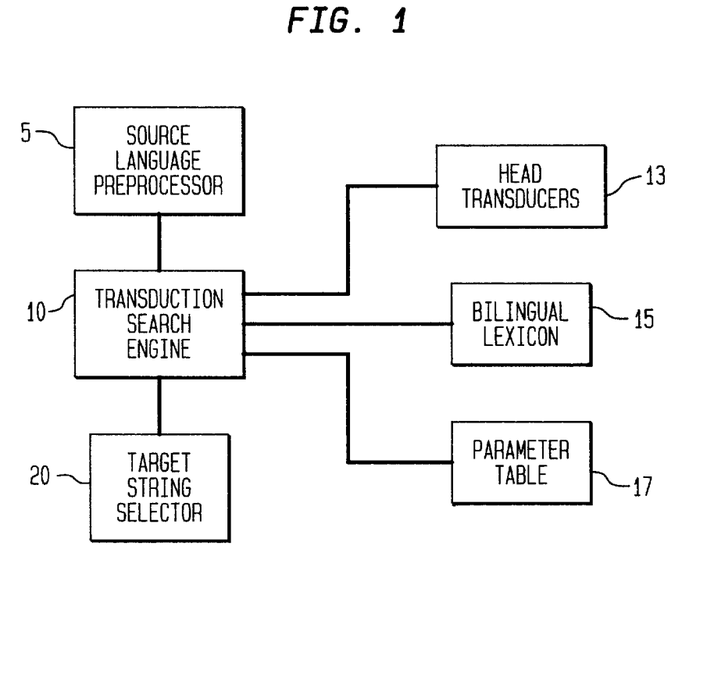
FIG. 1 shows a preferred embodiment of a translator according to the present invention.
Figure 2:
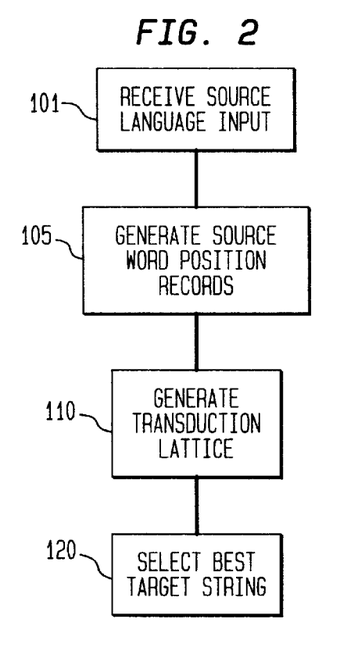
FIG. 2 is a flow chart of a method for translation according to the present invention using the translator of FIG. 1.

FIG. 1 is an illustration of a preferred embodiment of a translator 1 according to the present invention, and FIG. 2 is a flow chart of an embodiment of a method 1$a$ for translation utilizing the translator 1 shown in FIG. 1. The translator 1$a$ includes an optional source language preprocessor 5, a transduction search engine 10, a plurality of head transducers 13, a bilingual lexicon 15, a parameter table 17 and a target string selector 20.

In step 101, a source language input is provided for translation. As previously described, the source language may be written or spoken language. In a preferred embodiment, the source language input is converted to a plurality of word position records, as indicated in step 105. Each of such word position records consists of a source word, w, two position indicators i and j, and a cost, $c_0$, e.g., (w, i,j, $c_0$). The word position record indicates that there is a word, w, from position i to position j in the input with certainty indicated by the cost $c_0$, a lower cost indicating a higher certainty.

The word-position record format is used because it is a compact way of representing possible input strings from a number of source language preprocessing components 5. Such input strings can be in the form of plain text, or the output of a speech recognizer or the output of a text segmenter for languages, such as Chinese, which do not include spaces between the words. In the case of plain text, there is one record for each input word, and the cost $c_0$ is zero for all records. Thus, the record for an input word string "$w_1$, $w_2$ ... $W_n$" is ($w_1$, 0, 1, 0), ($w_2$, 1, 2, 0), ... ($W_n$, n−1, n, 0).

For preprocessing devices 5 with some degree of uncertainty about the identity of the input words or their position, such as, for example, a speech recognizer or a Chinese text segmenter, there will typically be more input records than for plain text. In that case, the input records are preferably organized as a word lattice data structure, which is a well-known construct for storing a collection of possible strings, allowing substrings to be shared. In the case of speech recognition, for example, the indices i andj may correspond to time points in the input speech signal, and the cost $c_0$ indicates the degree to which the input speech signal between i and j matches a reference acoustic pattern for w. One such language recognition system is described in Ser. No. 08/631,874 filed Apr. 10, 1996, which is assigned to the present assignee and incorporated by reference herein.

In the case of spoken language translation, the input to the transduction search engine 10 can be either the plurality of word string hypotheses generated by the speech recognizer's acoustic model, or, alternatively, the "best" word string selected from the plurality of word string hypotheses by the speech recognizer's language model. Again, if the input is a plurality of word string hypotheses, it is preferably organized as a word lattice, and if the input is a single "best" string, it is organized as word-position records, as described above.

A set of indices I for the start of the input and J for the end of the input must be identified, as well. In the plain text example presented above, I={0} and J={n}. Any "path" through the word lattice from a member of I to a member of J corresponds to a possible input source string spanning the entire input. The output of the translator will be a target string "$v_1, v_2 \ldots$" being the lowest cost translation of any such string spanning the entire input.

A detailed description of the various source language preprocessors 5 will not be provided; such preprocessors are known to those skilled in the art. In essence, the source-language preprocessor 5 converts the written or spoken language for translation into a format convenient for use by the transduction search engine 10.

The head transducers 13 are finite state machines. Each head transducer 13 is associated with a pair of head words with corresponding meanings in the source and target languages. For example, one of the head words may be an English verb, w, and the other a Chinese verb, v. When used for English to Chinese translation, the purpose of a head transducer 13 for w and v is to recognize or read the dependent words of w to its left and right in the source sentence ("the left source sequence" and "the right source sequence") and propose corresponding dependents to the left and right of v in the target sentence ("the left target sequence" and "the right target sequence") being generated. In proposing which sequence to write target dependents to, the head transducer 13 takes into account the required word order for the target language. The heads of each of the dependent phrases are similarly translated, and then their dependents, and so on, by the transduction search engine. This process is referred to herein as recursive head transduction.

Figure 3:
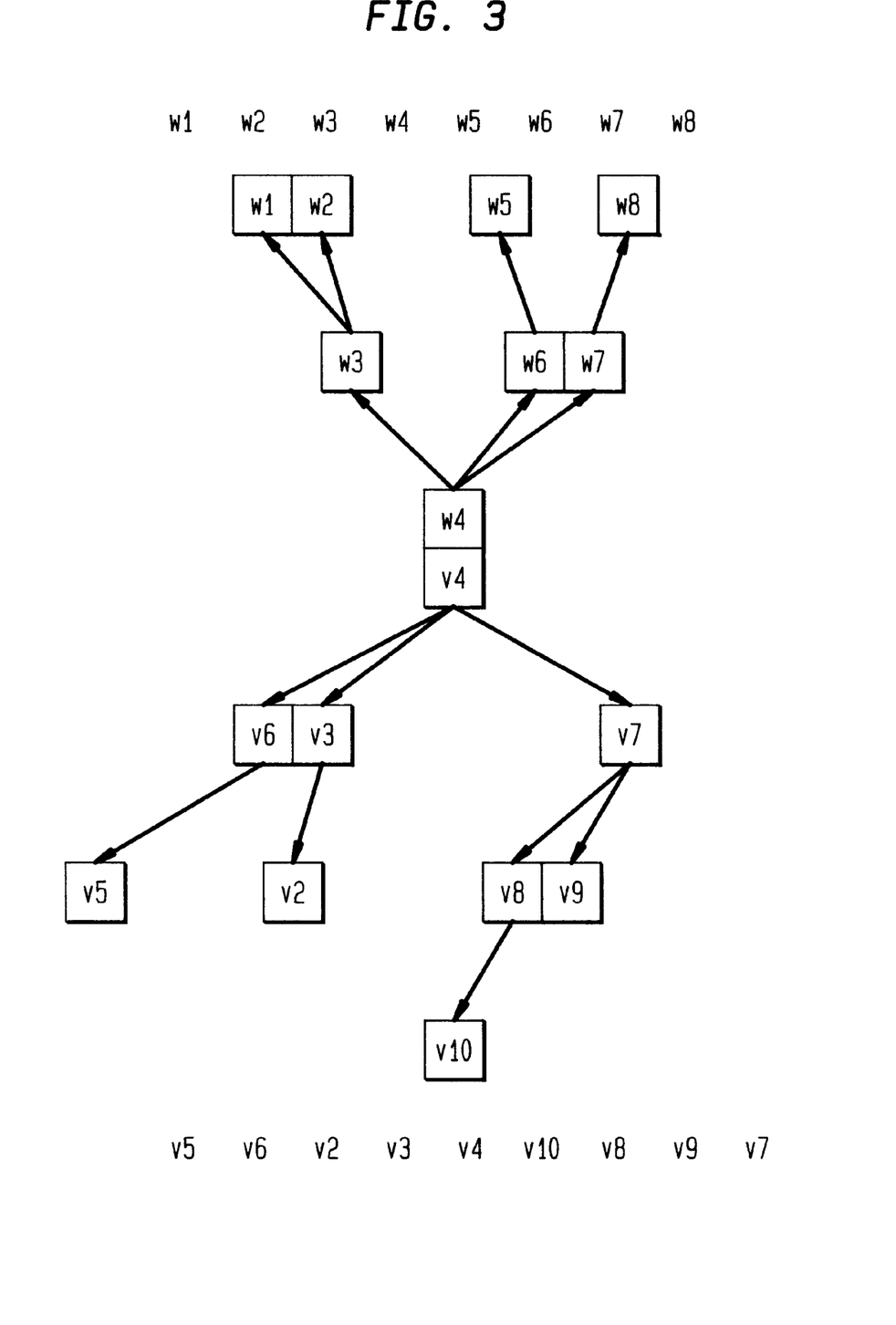
FIG. 3 illustrates recursive transduction of a source language string to a target language string.

Recursive head transduction is illustrated in FIG. 3, wherein a source sentence "$w_1w_2w_3w_4w_5w_6w_7W_8$" is converted to a target sentence "$v_5v_6v_2v_3v_4v_{10}v_8v_9v_7$". The top-level corresponding heads are $w_4$ and $v_4$, and the pairs of corresponding dependent words are $(w_3, v_3)$, $(w_6, v_6)$ and $(w_7, v_7)$. At the next level, $w_6$ and $v_6$ have a single corresponding pair of dependents $(w_5, v_5)$, and so on. Note that in the example shown in FIG. 3, the word order of the target sentence is different than that of the source sentence. This may occur since word order may vary with language. The head transducer 13 is characterized by a finite set of states, Q, and a tranducer action table specifying possible actions that the head transducer 13 can take. One possible action includes a start action; the head transducer can start in state q∈Q with empty target sequences. A second possible action is a stop action; the head transducer can stop in state q∈Q, in which case both target sequences are considered complete. Another possible action is a transition. A transition will occur if in state q the head transducer 13 can enter state q' after reading a symbol w' from one of the input sequences and writing a symbol v' to one of the target sequences.

The positions from which symbols are read and written are also specified in the transitions. To allow for translation of a source string into a target string of a different length, the input and output symbols w' and v' are permitted to be the empty string, denoted ε.

As previously described, the head transducers 13 utilized in the present invention are different than "standard" finite state transducers known in the art. The latter are typically limited to converting a single input sequence into a single output sequence, usually reading the input sequence and writing the output sequence from left to right. Compared with such transducers, a head transducer according to the present invention with the same number of states as a standard transducer is capable of producing a greater degree of divergence between the ordering of words in the input and output sequences. This additional ordering flexibility results from the ability to write each output symbol, i.e., character, identifier, word or the like, to the left or right output sequence as necessary. An additional benefit of the present head transducers are that they work outwards from the head of a phrase typically resulting in more accurate translations since processing can start with a less common word, limiting the possibilities for translation.

Figure 4:
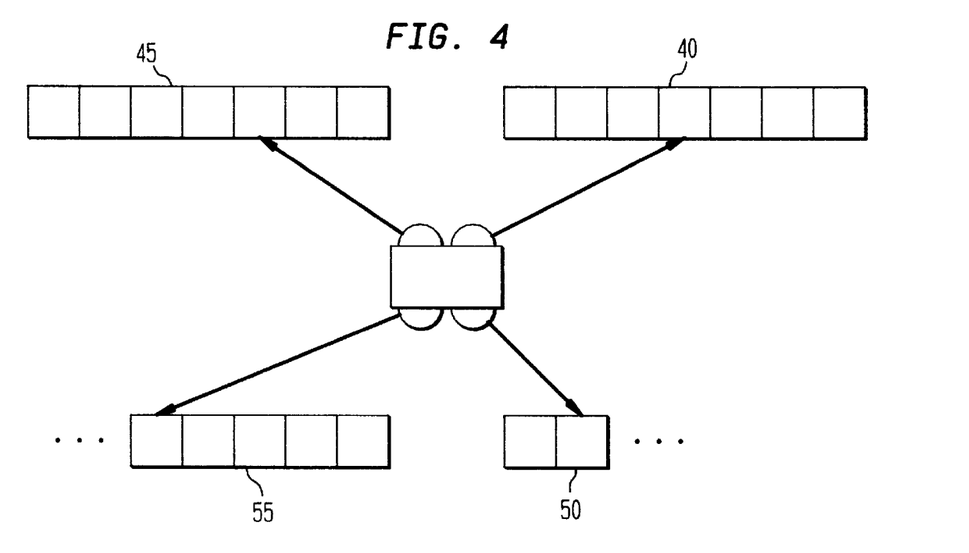
FIG. 4 illustrates exemplary possible head transducer actions for two head tranducers used for generating part of the transduction shown of FIG.3.

In a preferred embodiment of a translator according to the present invention, the reading and writing positions for transitions are restricted to certain "directions." In particular, corresponding to the four source-target combinations ($\rightarrow,\rightarrow$), ($\leftarrow,\rightarrow$), ($\rightarrow,\leftarrow$), ($\leftarrow,\leftarrow$) of the two source and two target sequences shown in FIG. 4, a transition may specify writing to the right end of the right target sequence 50, denoted$\rightarrow$, or writing to the left end of the left target sequence 55, denoted$\leftarrow$. Similarly, a transition may specify reading the next symbol of the right source sequence 40 going rightwards from the left end of this sequence, denoted$\rightarrow$, or reading the next symbol of the left source sequence 45, going leftwards from the right end of this sequence, denoted$\leftarrow$. Thus, in that preferred embodiment, there are four varieties of transitions. It should be understood that in other embodiments, there may be other varieties of transitions. For example, in an alternate embodiment, there are eight varieties of transitions, wherein the head transducers may read or write from the other ends of the sequences.

Entries in the bilingual lexicon, 15, are records of the form (w, v, M). Such a record "asserts" that the source word w can be translated into the target word v, and the dependents of w may be converted into the dependents of v according to the head transducer M. When such an entry is applied by the translator 1, the entry has "activated" the head transducer M.

As noted above, in a bilingual entry, one of the words w or v may be the empty string ε instead of a normal word in the vocabulary of the language. Entries with an empty string are used for translations involving a word in one language without a corresponding word in the other language. Examples include the introduction of an article or the translation of a source word into two target words. As used herein, the terms word, string and phrase can mean empty string, unless otherwise noted. In a preferred embodiment, the head transducer M of a lexical entry with an empty string is restricted to having a single state $q_0$ and no transitions.

As previously described, the conversion of a pair of source sequences into a pair of target sequences requires a series of actions by a head transducer 13. Such actions include a start action, a series of zero or more transitions and a stop action. A cost can be assigned to each of such actions. A translator according to the present invention generates possible translations by applying head transducers 13 to convert the dependents of the head of the source sentence into the dependents of the head of the target sentence, and recursively transducing the dependents of these dependents using the transduction search engine 10. A total translation cost may be defined as the sum of the cost of all actions taken by all head tranducers involved in the translation. The translation with the lowest total cost is selected as the output of the translator, i.e., the translation. The cost of the various actions taken by the various head transducers 13 are provided in the parameter table 17.

Preferably, the costs specified in the parameter table 17 for a head transducer M take into account the identity of the source word w and the target word v in the bilingual lexicon entry that led to the activation of M. Specifically, the cost of a start action, $f$, is a function of M, w, v and the start state q, i.e., f (M, w, v, q). The cost of a transition, g, is a function of M, w, v, the states q and q' before and after transition, the source and target dependents w' and v', and the reading and writing directions $d_1$ and $d_2$, i.e., g (M, w, v, q, q', w, w', v', $d_1$, $d_2$). The cost of a stop action, h, is a function of M, w, v and the stop state q, i.e., h (M, w, v, q).

Thus, the costs in the parameter table 17 include not only costs for the appropriateness of translating one source language word into a corresponding target language word, but also the cost of associations between head-dependent words in each of the two languages. The strengths of these associations, i.e., the likelihood of co-occurrence of such words, can influence the selection of the target sentence, a stronger association being indicated by a lower cost.

Figure 5A:
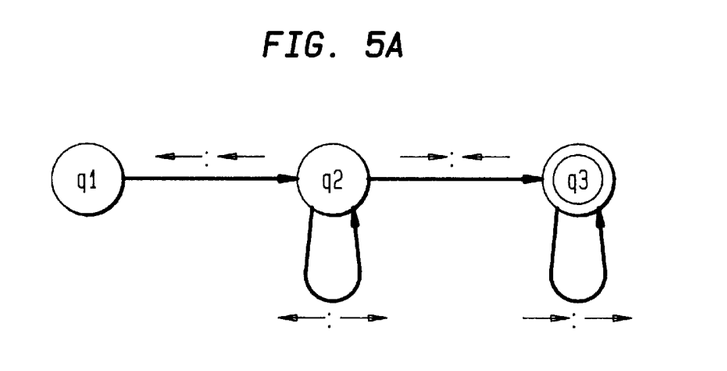
FIG. 5 is a flow chart depicting an embodiment of the transduction search engine.
Figure 5B:
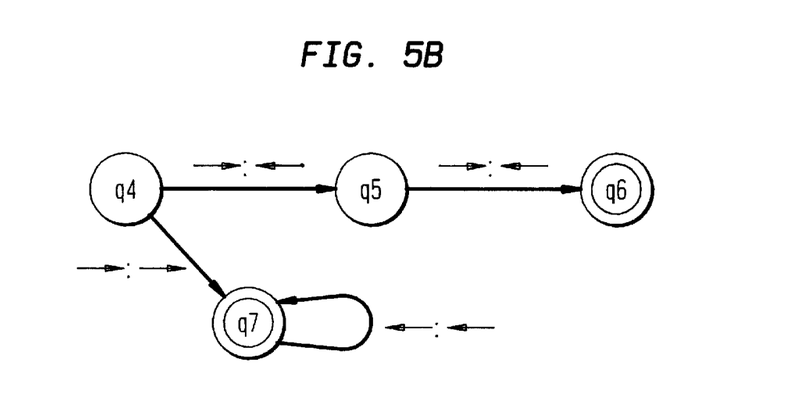

FIGS. 5A & 5B show exemplary possible transitions for head transducers $M_1$ and $M_2$, respectively, for generating part of the string transduction shown in FIG. 3. States are shown as circles and transitions as arrows labeled with source and target directions. States at which stop actions may take place are shown as double circles. The relevant parameter table entries required for this transduction are also shown below in Table 1. The actions of $M_1$ convert the dependent sequences for $w_4$ into those for $v_4$ and the actions for $M_2$ convert the dependent source sequences for $w_7$ into those for $v_7$.

TABLE 1

PARAMETER TABLE ENTRIES

START ACTION COSTS

| | | | | |
|---|---|---|---|---|
| $M_1$ | $w_4$ | $v_4$ | $q_1$ | $c_1$ |
| $M_2$ | $w_7$ | $v_7$ | $q_4$ | $c_2$ |

TRANSITION COSTS

| | | | | | | | | | |
|---|---|---|---|---|---|---|---|---|---|
| $M_1$ | $w_4$ | $v_4$ | $w_3$ | $v_3$ | $q_1$ | $q_2$ | ← | ← | $c_3$ |
| $M_1$ | $w_4$ | $v_4$ | $w_6$ | $v_6$ | $q_2$ | $q_3$ | → | ← | $c_4$ |
| $M_1$ | $w_4$ | $v_4$ | $w_7$ | $v_7$ | $q_3$ | $q_3$ | → | → | $c_5$ |
| $M_2$ | $w_7$ | $v_7$ | $\epsilon$ | $v_9$ | $q_4$ | $q_5$ | → | ← | $c_6$ |
| $M_2$ | $w_7$ | $v_7$ | $w_8$ | $v_8$ | $q_5$ | $q_6$ | → | ← | $c_7$ |

STOP ACTION COSTS

| | | | | |
|---|---|---|---|---|
| $M_1$ | $w_4$ | $v_4$ | $q_3$ | $c_8$ |
| $M_2$ | $w_7$ | $v_7$ | $q_6$ | $c_9$ |

Referring to FIG. 5A and Table 1, head transducer $M_1$, with states $q_1$, $q_2$, $q_3$, is activated by a lexical entry ($w_4$, $v_4$, $M_1$), starting in state $q_1$ with cost $c_1$. A transition from $q_1$ to $q_2$ with directions (←,←) and cost $c_3$, reads source word $w_3$ leftwards and writes target word $v_3$, also leftwards. A transition from $q_2$ to $q_3$ with directions (→,←) reads source word $w_6$ rightwards and writes target word $v_6$ leftwards. A third transition from state $q_3$ back to $q_3$ with directions (→,→) reads source word $W_7$ rightwards and writes target word $v_7$ also rightwards. Transducer $M_1$ then undergoes a stop action in state $q_3$ with cost $c_8$.

Referring now to FIG. 5B and Table 1, head transducer $M_2$ is activated by an entry ($w_7$, $v_7$, $M_2$), starting in state $q_4$ with cost $c_2$. $M_2$ makes a transition to state $q_5$, reading the empty string $\epsilon$ and writing the target word $v_9$ leftwards. It then makes a transition to state $q_6$, reading the word $w_8$ rightwards and writing the word $v_8$ leftwards. Transducer $M_2$ then undergoes a stop action in state $q_6$ with cost $c_9$.

Figure 6:
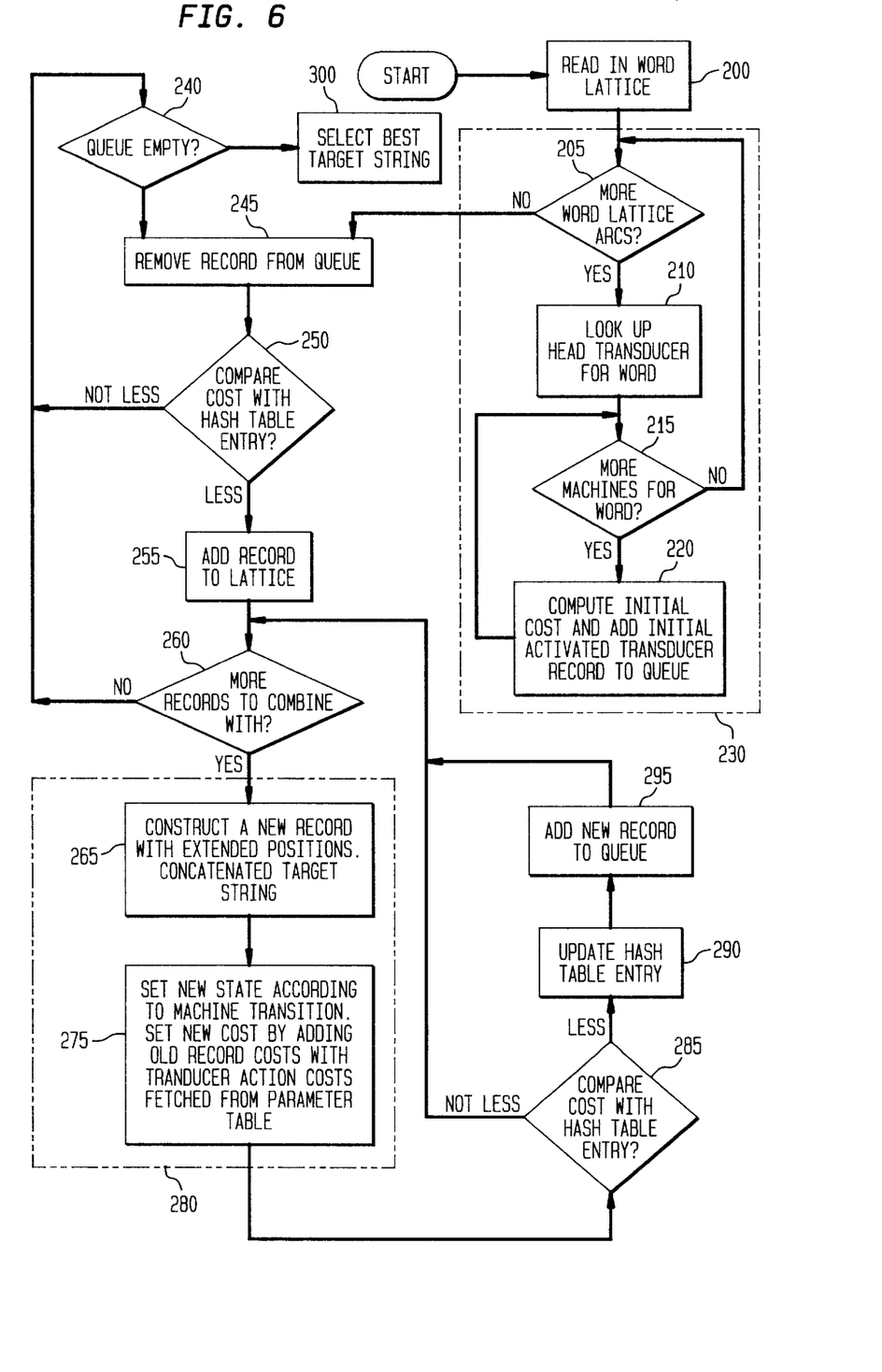
FIG. 6 illustrates a method by which a target string is selected as the translation from the output of the transduction search engine.

Returning to FIG. 2, a transduction lattice is generated based on the input source language in step 110. The transduction lattice is generated by the transduction search engine 10. The target string selector 20 selects "the translation" from the output of the search engine 10. FIG. 6 depicts an embodiment of a method by which the transduction search engine 10 constructs the transduction lattice.

As indicated in step 200, the word position records or word lattice generated by the source language preprocessor 5 is received. The method begins with an initialization step, which is accomplished in steps 205 through 220, collectively identified by the reference numeral 230. Initialization takes place by adding to a queue a set of transduction records (M, w, v, i,j, $q_0$, v, $c_2$) developed from the word position records. The set of transduction records corresponds to activations of all bilingual lexical entries (w, v, A) for the source word w for each input word position record (w, i,j, $c_0$). Activating a bilingual lexical entry, i.e., activating a head transducer M, consists of retrieveing the entry from the bilingual lexicon 15 that is stored in a memory device. The parameter table 17 includes the cost $c_1 = f(M, w, v, q_0)$ for starting the head transducer M in state $q_0$, and $c_2 = c_1 + c_0$. All head transducers for each word w in the word lattice or word position records are activated through the loops set up by decision blocks 215 and 205.

According to the present invention, only the head transducers related to the source words in the input word position records or word lattice are activated. In other words, according to the present invention, it is not necessary to load the entire lexicon into RAM. In contrast, typical prior art translators require that their entire collections of grammatical rules, translation rules and the like be loaded into RAM. The present translation system and methods may thus be implemented on computers having limited RAM memory.

The remaining steps 240–295 form a loop that consumes items from the queue and creates new transduction records. Decision block 240 queries whether the queue is empty. If it is, then all low cost records that can be developed from the source words have been "extended" as fully as possible, i.e., all applicable transitions by the head transducers have been made. The transduction lattice, i.e, the collection of transduction records developed by the transduction search engine 10, is then post-processed in the target string selector 20 to select the best translation, as indicated in step 300.

If the queue is not empty, processing continues with step 245, wherein a transduction record is removed from the queue. In a preferred embodiment of the present method, the cost c of the transduction record is compared with the current lowest cost record in step 250. The lowest cost record is identified in a hash table. The entries in the hash table include a hash key, (w, v, i, j, q, M), and a hash value that is a pointer to the transduction record. The hash table maintains the pointer to the lowest cost transduction record found between i and j headed by w in state q of machine M. The information making up the hash key is referred to as a "full state" and c is referred to as the "full state cost". If the cost c of the transduction record under consideration ("the current record") is not less than the full state cost, the current record is discarded or "pruned". Processing then returns to step 240 to determine if another transduction record is available. If the current record has a lower cost than the lowest cost record identified in the hash table, it is added to the transduction lattice in step 255. While step 250 is not required as a step in the present method, it improves efficiency because it avoids creating transduction records that will be discarded later.

If, after adding the transduction record to the transduction lattice in step 255, the transduction record is adjacent to another phrase, then a combination action may take place. Thus, decision block 260 queries whether or not there are more phrases to combine with. If not, processing loops back to decision block 240. If there are more phrases, a combination operation performed by the steps collectively identified by the reference numeral 280 results in a new record for an extended partial translation. The old records still remain in the lattice. Combination operations are described in more detail later in this specification.

For each new transduction record resulting from the combination operations, the cost of the record is compared, in step 285, with the full state cost in the hash table. If the cost of the new record is higher than the full state cost, then processing returns to step 260 without adding the new record to the queue so that it is effectively discarded. If the cost of the new record is less than the full state value, then the hash table entry is updated with the new record pointer in step 290 and the old full state record is removed form the transduction lattice. The new low cost record is then added to the queue in step 295 and processing continues with step 260.

Figure 7:
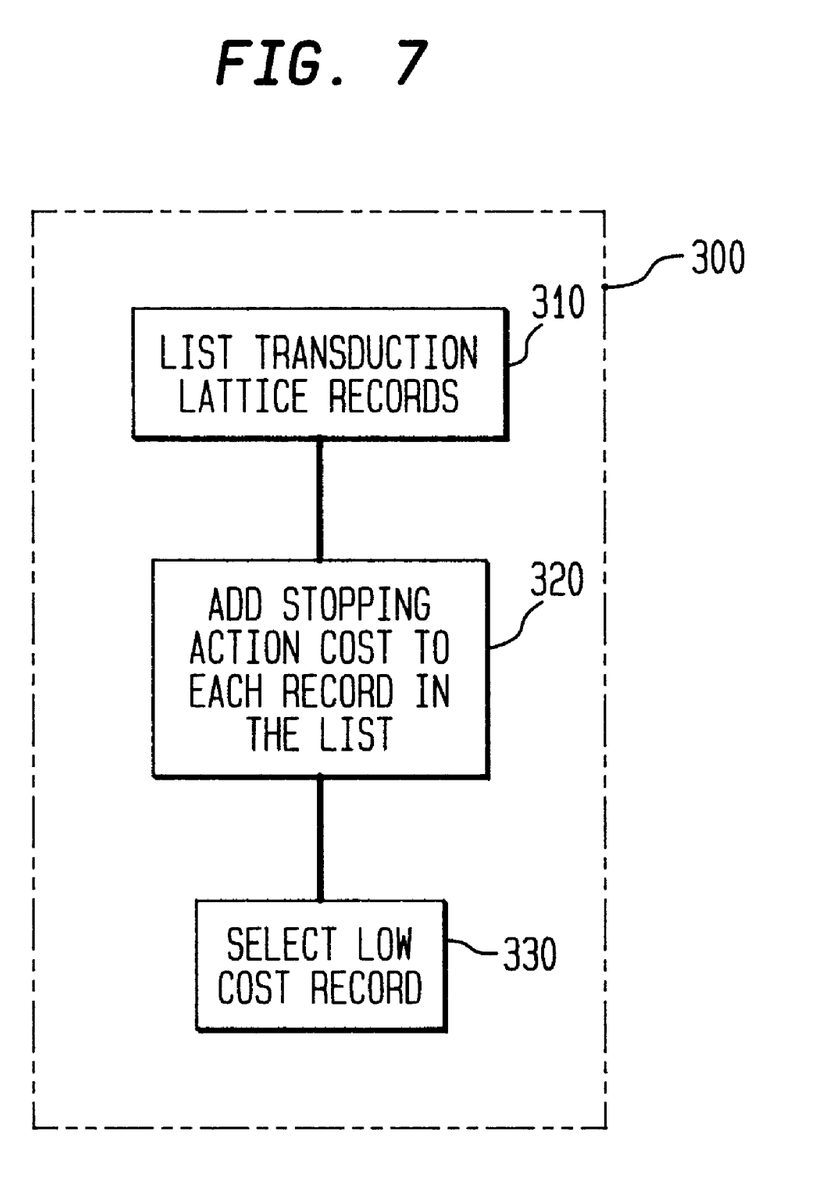
FIG. 7 illustrates an exemplary technique for low cost string selection according to this invention.

After the queue has been emptied, processing continues with step 300, wherein the target string selector 20 selects the word string having the lowest cost. A method for such low cost string selection is shown in FIG. 7. In a first step 310, a list of all lattice records (M, w, v, i, j, q, t, c) from an initial input position i∈I to a final input position j∈J is compiled. In step 320, the stopping action cost h(M, w, v, q) specified in the parameter table 17 is added to each record in the list. Finally, in step 330, the string t from the record having the lowest total cost is selected as the translation. If there are several such spanning records with the same low cost, then select one of such records at random.

As previously described, if adding a transduction record to the lattice makes it adjacent to another transduction record, then a combination action may take place resulting in an extended partial translation. Each combination corresponds to a transition action of the head transducer for one of the two transduction records. Specifically, the combination is a transition action for the transducer acting as the head in the combination, the other record acting as the dependent in the combination. If successful, the combination operation results in a new record for an extended partial translation, with the old records remaining in the lattice.

The four combinations of transition directions previously described correspond to four types of transduction or combination steps arising from the choice of left or right source direction and left or right target direction. An exemplary transduction step will be described for a left source direction (←) and a right target direction (→). The other three types of transduction steps are analogous, with the source phrase records and the target string concatenation reversed as appropriate. If the transduction lattice contains adjacent partial translations $(M_1, w_1, v_1, i, k, q_1, t_1, c_1)$ and $(M_2, w_2, v_2, k, j, q_2, t_2, c_2)$, and the action table for M2 includes a transition $q_2$ to $q'_2$ with source direction←, target direction→, and the parameter table 17 includes a cost, $c_3=g(M_2, w_2, v_2, w_1, v_1, q_2, q'_2, ←, →,)$ for this transition with source dependent word $w_1$ and target dependent word $v_1$, and the action table for $M_1$ includes a stop action in state $q_1$ for which the parameter table 17 includes a cost $c_4=h(M_1, w_1, v_1, q_1)$, then a new extended partial translation $(M_2, w_2, v_2, i, j, q'_2, t', c_5)$ is created, where: $c_5=c_1+c_2+c_3+c_4$ and t'=concatenate $(t_2, t_1)$.

In other words, the head transducer $M_2$, activated by a bilingual entry $(w_2, v_2, M_2)$ has undergone a transition "consuming" a dependent source string to the left (headed by $w_1$) and extending the target string $t_2$ to its right by a string $t_1$ (headed by $v_1$), $t_1$ being the translation of the "consumed" string.

The transduction step described above applies unless the dependent source word for the transition, e.g., $w_1$ in the above example, is ε, the empty string. For such transitions, only the old record for the head word, i.e., $(M_2, w_2, v_2, ε, k, j, q_2, t_2, c_2)$ is required for the transition to take place. The parameter table 17 must then include the cost $c_3=g(M_2, w_2, v_2, ε, v_1, q_2, q'_2, ←, →)$ and the lexicon must include an entry (ε, $v_1$, $M_1$). As previously described, the head transducer $M_1$ will then only have a single state $q_0$ and no transitions. The new record created by the transduction step is $(M_2, w_2, v_2, k, j, q'_2, t', c_6)$, where $M_2, w_2, v_2, k, j$ and $q'_2$ are as before, $c_6 c_2+c_3+f(M_1, ε, v_1, q_0) +h (M_1, ε, v_1, q_0)$, and t'=concatenate $(t_2, v_1)$.

Transduction steps involving empty strings cannot result in non termination of the search process because of the check in the transduction loop ensuring that partial translations added to the queue must have a lower cost than previous phrases with the same full state.

Regarding cost parameters, the present invention does not require any specific interpretation of the various cost parameters for transducer actions other than the general requirement that lower costs correspond to more desirable translations. In a preferred embodiment, the cost function is negated log likelihood. Log-likelihood costs can be determined as follows for the present invention. Transducer actions are taken to be events in a so-called generative model, specifically a probabilistic model for simultaneously generating a source language string and a target language string. A data set of source sentences for a particular translation application are collected. A parameter table is created in which all costs are the same constant value. The translator is run with each of the source sentences from the data set, keeping a count of all transducer actions taken. The resulting source and target sentence pairs are presented to an individual competent in both languages so they may classify the translations as acceptable or unacceptable. Counts leading to unacceptable translations are discarded and probabilities are estimated from the remaining counts using standard statistical methods. For each estimated probability P(e) for an action e, set the cost for e equal to −log(P(e)), and construct a new parameter table from such costs.

It will be appreciated that other methods for estimating probabilities known to those skilled in the art can be used, such as expectation-maximization. Further, cost functions other than log-likelihood can be used, such as, without limitation, the likelihood ratio. The likelihood ratio is the number of times in training that a particular transducer action leads to the incorrect string and the number of times that it leads to selecting a correct string.

It should be understood that the embodiments described herein are illustrative of the principles of this invention and that various modifications may occur to, and be implemented by, those skilled in the art without departing from the scope and spirit of this invention.

For example, in other embodiments of a translator according to the present invention, means other than "costs" can be used for selecting the best transduction. Such means include, without limitation, constraints. Non-limiting examples of constraints for use in the present translator include unification constraints and selectional restrictions. In such constraint-based translators, the parameter table 17 is not required. In some embodiments, a constraint table 17a will replace the parameter table 17. Note that in such constraint-based translators, the transduction search engine 10a will admit the results of combinations on a basis other than cost. In alternate embodiments, the "best" translation is selected at random from candidate translations so that a target string selector 20a is not required.

In most non-trivial translation applications, a plurality of head transducers 13 are required. In some simple applications, however, such as translating certain collections of computer instructions, a single head transducer 13 can be used for translation.

I claim:

1. A translator for translating a phrase in a source language into a phrase in a target language, comprising:
    a plurality of head transducers, each head transducer associated with a pair of head words with corresponding meanings in the source and target languages, each head transducer for converting left and right ordered source language sequences of dependents of the source language head word into left and right ordered target language sequences of dependents of the target language head word;
    a bilingual lexicon that associates each transducer with the pair of head words;
    a parameter table that provides costs for each action taken by each head transducer;
    a transduction search engine that generates a plurality of candidate translations of the source language phrase using the head transducers and provides a total cost for each of the candidate translations, wherein the total cost of a translation is the sum of the cost for all actions taken by each transducer involved in the translation; and
    a target string selector that selects a best translation from the plurality of candidate translations by searching for the translation that has the lowest cost.

2. The translator of claim 1 wherein the actions are selected from the group consisting of start actions, stop actions and transitions, wherein a transition indicates a first direction and a second direction, the first direction for reading from the left and right ordered source language sequences and the second direction for writing to the left and right ordered target language sequences, so as to affect desired ordering differences between the source and target sequences.

3. The translator of claim 2 wherein the costs for transition actions are indicative of the likelihood of co-occurence for two source language words and the likelihood of co-occurence for two target language words.

4. The translator of claim 1 further comprising a source language preprocessor for converting the source language phrase into a format useable by the transduction search engine.

5. The translator of claim 4 wherein the format is at least one word position record.

6. A computer-readable storage medium comprising encoded computer-readable program instructions for use in conjunction with a programmable computer, which instructions cause the computer to translate a phrase from a source language into a phrase in a target language utilizing a plurality of finite state transducers that convert a pair of left and right ordered source language sequences of dependents of a source language head word into a pair of left and right ordered target language sequences of dependents of a target language head word.

7. A translator for translating a string in a source language into at least one string in a target language, comprising:
    at least one head transducer, the head transducer associated with a pair of head words with corresponding meanings in the source and target languages, the head tranducer for converting left and right ordered source language sequences of dependents of the source language head word into left and right ordered target language sequences of dependents of the target language head word;
    a bilingual lexicon that associates the transducer with the pair of head words;
    a table containing a plurality of parameters selected from the group consisting of costs and constraints, wherein one parameter of the plurality is assigned to each action of the at least one head transducer;
    a transduction search engine that generates a plurality of candidate translations of the source language phrase using the at least one head transducer and assigns a value to the translation wherein the value is a function of the parameters involved for all actions taken by the at least one transducer involved in the translation; and
    a target language string selector that selects one translation from the plurality of candidate translations.

8. The translator of claim 7 wherein the target language string selector selects the one translation based on a comparison of the assigned value for each candidate translation of the plurality.

9. The translator of claim 7 wherein the constraints are implicit in the head words present in the bilingual lexicon.

10. The translator of claim 7 wherein the constraints are selected from unification constraints and selectional restrictions.

11. A method for translating a phrase in a source language to a phrase in a target language, comprising the steps of:
    (a) activating state machines associated with each word in the source language phrase, wherein the activated state machines are selected from a plurality of such state machines associated with a plurality of words defining a lexicon, each of the activated state machines for converting a pair of source language strings into a pair of target language strings, and further wherein each state machine is characterized by an initial state;
    (b) generating a first plurality of transduction records, wherein, a transduction record is generated for each word in the source language phrase and each transduction record is characterized by a state machine, a source word, a target string, two position indicators for locating the position of the source word in the source phrase, the initial state for the state machine and a cost;
    (c) generating a transduction lattice by forming a data structure comprised of the transduction records of step (b);
    (d) generating a plurality of extended transduction records, wherein an extended transduction record is formed when a transduction record within the transduction lattice consumes an adjacent transduction record in the transduction lattice by a state machine transition, and wherein the extended transduction record includes an extended target string constructed by concatenating the target string of the consumed and the consuming records in an order indicated by directions for the state machine transition, and a new cost that is the sum of the costs of the consumed record and the consuming record, a cost associated with the state machine transition of the consuming record and a cost associated with a stop undertaken by the consumed state machine;

(e) adding the extended transduction record to the transduction lattice;

(f) repeating steps (d) and (e) wherein a transduction record consumes an adjacent transduction record until all records have been fully extended; and (g) selecting the lowest cost transduction record spanning the entire source language phrase.

12. The method of claim 11, wherein the cost associated with the state machine transition is indicative of the likelihood of co-occurence of the words that activated the state machines for the consumed and consuming records and the likelihood of co-occurence in the target language of the corresponding target words for such records.

13. The method of claim 11 wherein, in step (e), the transduction record is added to the transduction lattice if the new cost of the extended transduction record is lower than a reference transduction record cost, and step (f) further comprises updating the reference transduction record cost by the extended transduction records added to the transduction lattice.

14. A method for converting an input signal representative of words, characters or identifiers characterized by a first format, into an output signal representative of words, characters or identifiers characterized by a second format, comprising the steps of:

splitting the input signal into two input subsignals at a position identified by an element of the input signal;

generating two output subsignals representative of the two input subsignals according to actions of a finite state machine in which transitions specify a direction indicating a choice of one of the two output subsignals so as to produce desired ordering differences between the elements of the input and output signals; and combining the two output subsignals.

* * * * *